(12) United States Patent
Cardona et al.

(10) Patent No.: US 8,830,870 B2
(45) Date of Patent: *Sep. 9, 2014

(54) NETWORK ADAPTER HARDWARE STATE MIGRATION DISCOVERY IN A STATEFUL ENVIRONMENT

(75) Inventors: Omar Cardona, Cedar Park, TX (US); Vinit Jain, Austin, TX (US); Rakesh Sharma, Austin, TX (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 102 days.

This patent is subject to a terminal disclaimer.

(21) Appl. No.: 13/570,773

(22) Filed: Aug. 9, 2012

(65) Prior Publication Data

US 2013/0086582 A1 Apr. 4, 2013

Related U.S. Application Data

(63) Continuation of application No. 13/252,649, filed on Oct. 4, 2011.

(51) Int. Cl.
*H04L 12/28* (2006.01)
*G06F 9/48* (2006.01)
*H04L 29/00* (2006.01)
*G06F 9/50* (2006.01)
*H04L 29/06* (2006.01)
*G06F 9/44* (2006.01)
*H04L 29/08* (2006.01)

(52) U.S. Cl.
CPC .............. *H04L 12/28* (2013.01); *G06F 9/4856* (2013.01); *H04L 29/00* (2013.01); *G06F 9/5077* (2013.01); *H04L 69/12* (2013.01); *G06F 9/44* (2013.01); *H04L 69/32* (2013.01)
USPC ........................................................ 370/254

(58) Field of Classification Search
CPC ... H04W 24/00; H04L 43/50; H04L 43/0852; H04L 43/08; H04L 41/12; H04L 45/00; H04L 45/04; H04L 41/04; H04B 17/003
USPC .................................................. 370/252, 254
See application file for complete search history.

(56) References Cited

U.S. PATENT DOCUMENTS 7,937,518 B2   5/2011   Boyd et al.
7,937,698 B2   5/2011   Belisario et al.

(Continued)

FOREIGN PATENT DOCUMENTS

CN   1947096 A    4/2007
CN   101132329 A  2/2008

(Continued)

OTHER PUBLICATIONS

Office Action for U.S. Appl. No. 13/252,676 (Alanis et al., "Live Logical Partition Migration with Stateful Offload Connections Using Context Extraction and Insertion," filed Oct. 4, 2011), US Patent and Trademark Office, mailed Apr. 15, 2013, 35 pages.

(Continued)

*Primary Examiner* — Dady Chery
(74) *Attorney, Agent, or Firm* — VanLeeuwen & VanLeeuwen; John D. Flynn

(57) ABSTRACT

An approach is provided in which a discovery system receives a migration request to move a virtual machine that executes on a first system. The discovery system identifies a first network adapter corresponding to the first system, and identifies hardware state data used by the first network adapter to process data packets generated by the virtual machine. In turn, the discovery system identifies a second network adapter that is compatible with a native format of the hardware state data, and migrates the virtual machine to a second system corresponding to the identified second network adapter.

22 Claims, 13 Drawing Sheets

(56) References Cited

U.S. PATENT DOCUMENTS

| | | |
|---|---|---|
| 8,166,265 B1 | 4/2012 | Feathergill |
| 8,352,938 B2 | 1/2013 | Hunt et al. |
| 2007/0098010 A1 | 5/2007 | Dube et al. |
| 2008/0133709 A1 | 6/2008 | Aloni et al. |
| 2008/0189432 A1 | 8/2008 | Abali et al. |
| 2008/0310421 A1 | 12/2008 | Teisberg et al. |
| 2009/0150527 A1 | 6/2009 | Tripathi et al. |
| 2010/0325485 A1 | 12/2010 | Kamath et al. |
| 2011/0022812 A1 | 1/2011 | van der Linden et al. |
| 2011/0035498 A1 | 2/2011 | Shah et al. |
| 2011/0093849 A1 | 4/2011 | Chawla et al. |
| 2011/0213911 A1* | 9/2011 | Eidus et al. .................. 711/6 |
| 2011/0231696 A1* | 9/2011 | Ji et al. ..................... 714/3 |
| 2012/0221710 A1 | 8/2012 | Tsirkin |
| 2013/0033993 A1 | 2/2013 | Cardona et al. |
| 2013/0034094 A1 | 2/2013 | Cardona et al. |
| 2013/0034109 A1 | 2/2013 | Cardona et al. |
| 2013/0086298 A1 | 4/2013 | Alanis et al. |
| 2013/0097600 A1 | 4/2013 | Cardona et al. |

FOREIGN PATENT DOCUMENTS

| | | |
|---|---|---|
| CN | 101593133 A | 12/2009 |
| CN | 102103524 A | 6/2011 |

OTHER PUBLICATIONS

Kadav, A. et al., "Live Migration of Direct-Access Devices", Operating Systems Review, v 43, n 3, 95-104, Jul. 2009; ISSN: 0163-5980; DOI: 10.1145/1618525.1618536, ACM, USA.

International Search Report and Written Opinion for PCT Application PCT/CN2012/082060, mailed Jan. 3, 2013, 11 pages.

"Broadcom Ethernet Network Controller Enhanced Virtualization Functionality," White Paper, Broadcom VMWorld, Oct. 2009, 10 pages.

Office Action for U.S. Appl. No. 13/252,649 (Cardona et al., "Network Adapter Hardware State Migration Discovery in a Stateful Environment," filed Oct. 4, 2011), U.S. Patent and Trademark Office, mailed May 21, 2013, 34 pages.

* cited by examiner

| Candidate Table 300 | | | |
|---|---|---|---|
| HOST | | Network Adapter Properties | |
| Name | Host Properties | Name | Properties |
| Host A | HA Properties | Adapter M | AM Properties |
| | | Adapter N | AN Properties |
| Host B | HB Properties | Adaper O | AO Properties |
| Host C | HC Properties | Adapter P | AP Properties |
| Host D | HD Properties | Adapter Q | AQ Properties |
| Host E | HE Properties | Adapter R | AR Properties |
| | | Adapter S | AS Properties |
| Host F | HF Properties | Adapter T | AT Properties |

NETWORK ADAPTER HARDWARE STATE MIGRATION DISCOVERY IN A STATEFUL ENVIRONMENT

RELATED APPLICATION

This application is a continuation of U.S. application Ser. No. 13/252,649, filed Oct. 4, 2011, titled "Network Adapter Hardware State Migration Discovery in a Stateful Environment," and having the same inventors as the above-referenced application.

BACKGROUND

The present disclosure relates to identifying hardware properties of a source network adapter that processes data packets according to a stateful offload format and, in turn, discovering an equivalent destination network adapter that supports a native format of the hardware properties.

Modern communication network adapters support "stateful" offload data transmission formats in which the network adapters perform particular processing tasks in order to reduce a host system's processing load. Typical stateful offload formats include Remote Direct Memory Access (RDMA), Internet Wide RDMA Protocol (iWARP), Infiniband (IB), and TCP Offload Engine (TOE). In order to support the stateful offload formats, the network adapters restrict the "state" for any given virtual machine connection to the context of the network adapter's instance corresponding to the virtual machine. Stateful offload information that represents this context includes hardware state data that describes hardware properties on a per virtual machine basis, such as information corresponding to connections, registers, memory registrations, structures used to communicate with the virtual machine (Queue Pairs, Completion Queues, etc.), and other miscellaneous data structures, such as address resolution protocol (ARP) tables.

BRIEF SUMMARY

According to one embodiment of the present disclosure, an approach is provided in which a discovery system receives a migration request to move a virtual machine that executes on a first system. The discovery system identifies a first network adapter corresponding to the first system, and identifies hardware state data used by the first network adapter to process data packets generated by the virtual machine. In turn, the discovery system identifies a second network adapter that is compatible with a native format of the hardware state data, and migrates the virtual machine to a second system corresponding to the identified second network adapter.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 3 is an exemplary candidate table that includes host properties and corresponding network adapter property table entries;

DETAILED DESCRIPTION

Figure 1:
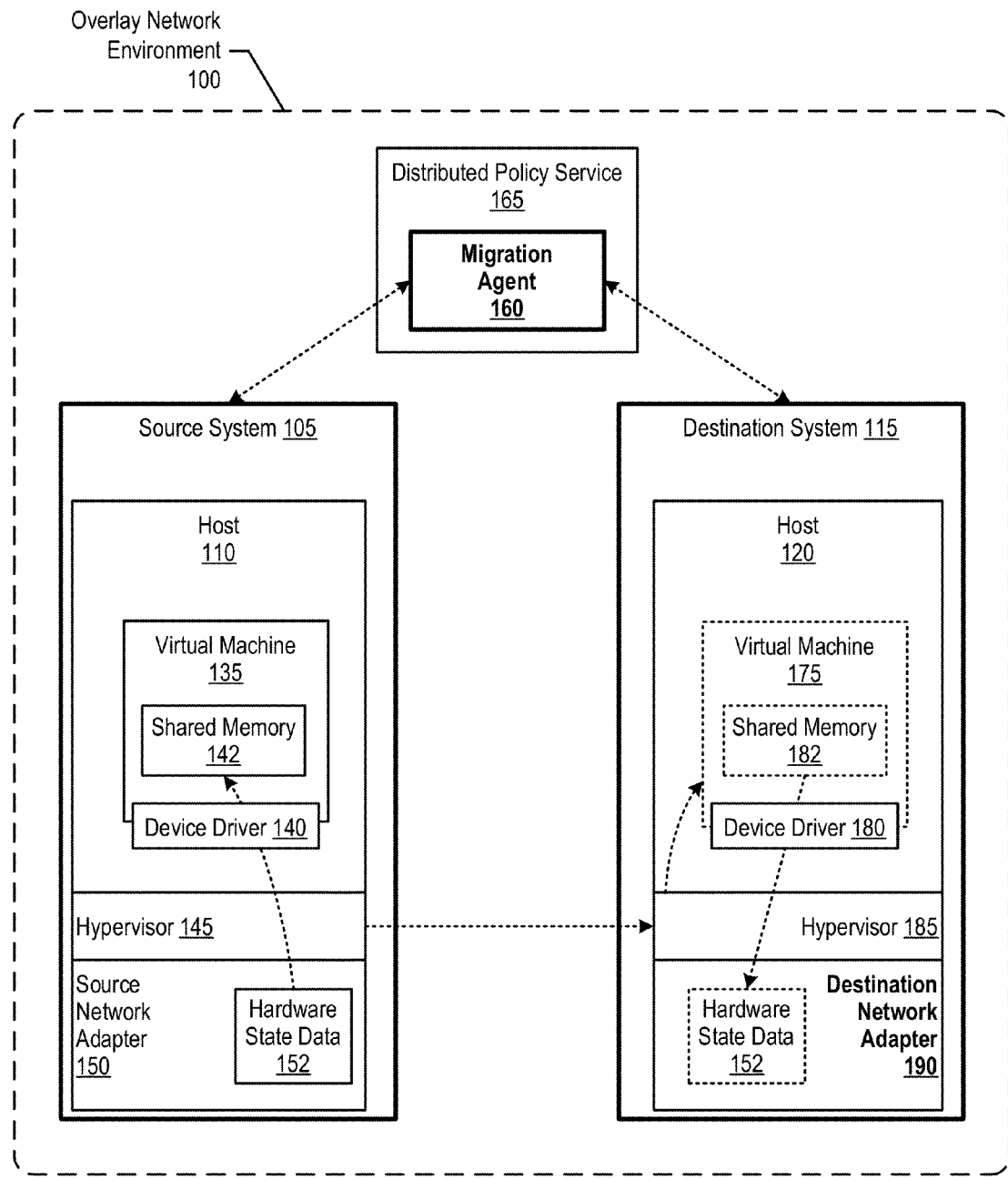
FIG. 1 is an exemplary diagram showing a migration agent migrating a logical partition, which includes a virtual machine and native network adapter hardware state data, from a source system to a destination system.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

The present disclosure describes a method for discovering a suitable destination system for which to migrate a virtual machine that sends data packets over a computer network based on a stateful offload format. As such, a system administrator has flexibility to migrate the virtual machine to a different destination system when required, such as due to security issues or network bandwidth issues.

FIG. 1 is an exemplary diagram showing a migration agent migrating a virtual machine, which includes native network adapter hardware state data, from a source system to a destination system. Overlay network environment 100 overlays onto a physical network and utilizes logical policies to send data between virtual machines over virtual networks. As such, the virtual networks are independent from physical topology constraints of the physical network (see FIG. 11 and corresponding text for further details).

Overlay network environment 100 includes source system 105. Source system 105 includes host 110 and source network adapter 150. Host 110 includes hypervisor 145, which provisions virtual machine 135 and device driver 140. Virtual machine 135 utilizes device driver 140 to send stateful offload data packets to source network adapter 150. For example, the stateful offload data packets may adhere to a stateful offload format such as Remote Direct Memory Access (RDMA), Internet Wide RDMA Protocol (iWARP), Infiniband (IB), or TCP Offload Engine (TOE).

In turn, source network adapter 150 processes the data packets utilizing hardware state data 152 and transmits the data packets to a destination virtual machine over overlay network environment 100. Hardware state data 152 includes stateful information that represents source network adapter 150's context, such as data pertaining to connections and structures used to communicate with virtual machine 135 (e.g., queue pairs, completion queues, etc.), and may also include register information, memory registrations, and other miscellaneous data structures (e.g., ARP tables, sequence numbers, retransmission information, etc.).

In one embodiment, hardware state data 152 includes Layer 4 (of the OSI Model) connection state information that allows source network adapter 150 to perform retransmission and packet acknowledgements, which alleviates host 110 from performing such menial tasks. For example, iWARP provides RDMA capability over a standard Ethernet fabric, which utilizes application buffers that are mapped to an underlying Ethernet adapter. When communication is initiated, a connection is made with the network adapter that initiates a TCP connection. Once active, data on the application's outgoing buffers are encapsulated by the network adapter as TCP segments as packets are built.

A system administrator may wish to migrate virtual machine 135 from source system 105 to a different system, such as for security purposes or network bandwidth management purposes). As such, the system administrator may send a migration command to migration agent 160 (included in distributed policy service 165), which is responsible for discovering a suitable destination system that includes a compatible host and an equivalent network adapter that supports overlay network environment 100. In one embodiment, a compatible host is one that satisfies a migrating virtual machine's system requirements, such as CPU requirements, memory requirements, bandwidth requirements, etc. In one embodiment, an equivalent network adapter is one that corresponds to the same vendor identifier and the same revision identifier as source network adapter 150.

Migration agent 160 proceeds through a series of discovery steps to identify destination system 115 as a suitable destination system. In one embodiment, migration agent 160 utilizes a candidate table, which includes host properties and network adapter properties, for which to identify the suitable destination system (see FIGS. 3, 5, and corresponding text for further details). In this embodiment, migration agent 160 determines that host 120 supports virtual machine 135's system requirements and destination network adapter 190 is equivalent to source network adapter 150 (e.g., includes matching device id, firmware version, and other relevant adapter attributes).

In order to migrate virtual machine 135, hardware state data 152 must also be migrated. Hardware state data 152, however, is partially or completely opaque to device driver 140 and virtual machine 135. As such, migration agent 160 indicates to source network adapter 150 (through device driver 140, hypervisor 145, or other driving agent) to extract hardware state data 152. Source network adapter 150 quiesces I/O and memory activity to avoid state changes or corruption during the extraction process, and copies hardware state data 152 via device driver 140 to shared memory 142 at a specified memory block starting address. The memory block starting address may be negotiated as part of its initialization or provided as a parameter in the extraction command to source network adapter 150.

Migration agent 160 sends a migration request to source system 105 and destination system 115 to migrate virtual machine 135. In turn, hypervisors 145 and 185 establish a connection to stream virtual machine 135 (includes shared memory 142) to host 120, resulting virtual machine 175 and shared memory 182. In addition, hypervisor 185 allocates device driver 180 to logical partition 170, and sends a state insert command to destination network adapter 190. The state insert command instructs destination network adapter 190 to retrieve the hardware state data from shared memory 182 at the memory block starting address, and load hardware state data 192 onto network adapter 190. As a result, hardware state data 152 maintains its native form when stored in destination network adapter 190, thus negating address translation steps.

In one embodiment, destination network adapter 190 performs a checksum to validate the hardware state data. In another embodiment, destination network adapter 190 may utilize a header or individual flags to efficiently set the context. In yet another embodiment, when source network adapter 150 remains active during the migration, migration agent 160 may facilitate one or more transactions between source network adapter 150 and destination network adapter 190 to verify the equivalence of their states.

Figure 2:
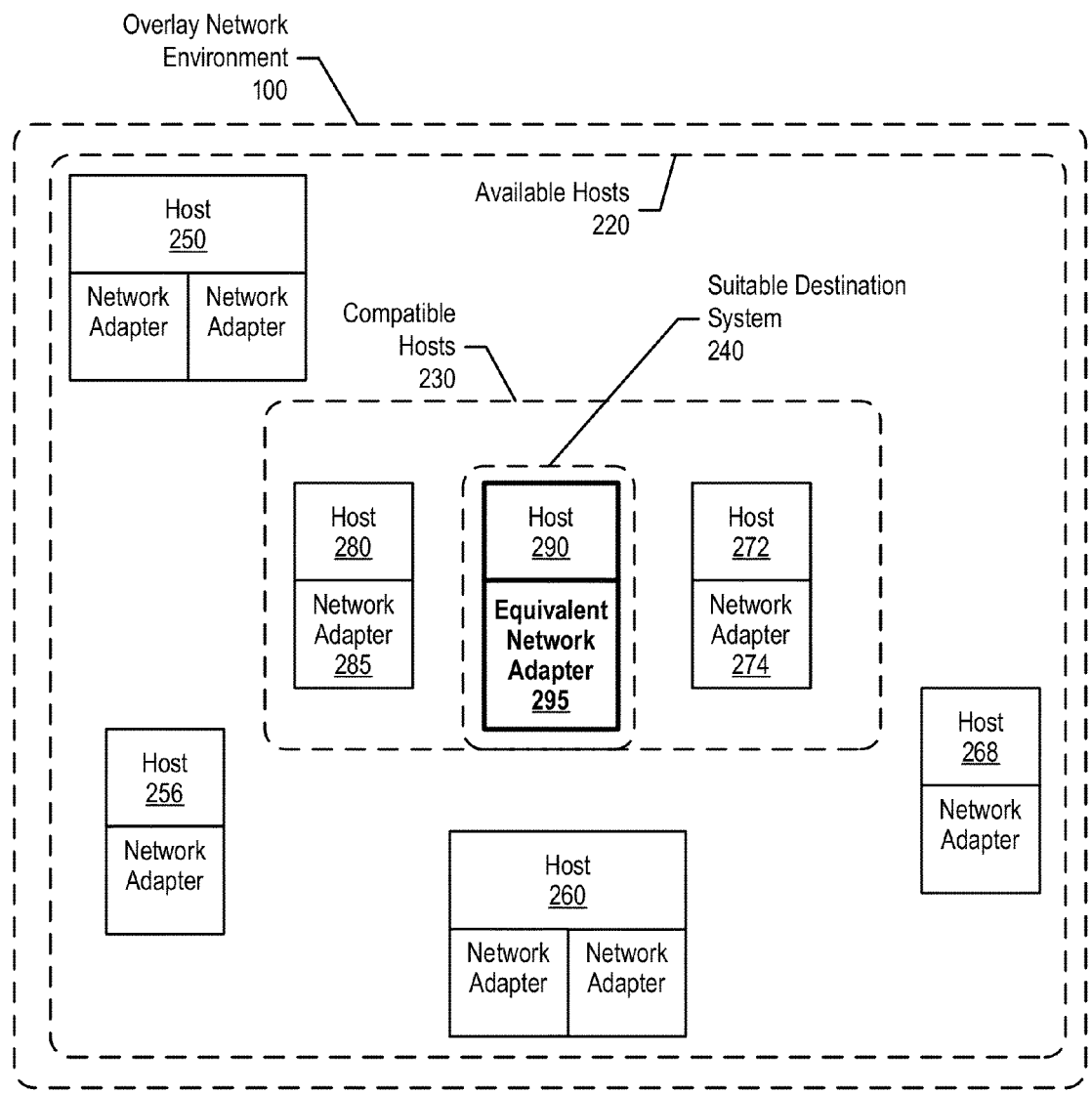
FIG. 2 is an exemplary diagram showing a graphical representation of discovering an suitable destination system.

FIG. 2 is an exemplary diagram showing a graphical representation of discovering a suitable destination system. In one embodiment, migration agent 160 iteratively selects a suitable destination system based upon available hosts, compatible hosts, and equivalent network adapters. In another embodiment, migration agent 160 uses a candidate table, such as that shown in FIG. 3, to perform such iteration steps.

The migration agent identifies available hosts 220 included in overlay network environment 100. Available hosts 220 include hosts 250-290, each utilizing various network adapters. The example in FIG. 2 shows that the migration agent determines that hosts 250-268 do not satisfy host requirements of the migrating virtual machine (e.g., not enough memory or bandwidth availability). As such, the migration agent identifies hosts 272-290 as "compatible" hosts 230, which meet or exceed host requirements of the migrating virtual machine.

Next, the migration agent analyzes network adapters 274, 285, and 295 corresponding to compatible hosts 230 in order to identify a network adapter that is equivalent to the network adapter utilized by the migrating virtual machine. In one embodiment, an equivalent network adapter is one that matches the migrating virtual machine's network adapter in both device ID and vendor ID. The example shown in FIG. 2 shows that network adapter 295 is equivalent to the migrating virtual machine's network adapter. As such, the migration agent sends a message to the source and destination systems' hypervisors to establish a connection and migrate the virtual machine from the source system to the destination system.

FIG. 3 is an exemplary candidate table that includes host properties and corresponding network adapter property table entries. A migration agent (as part of a distributed policy service) manages candidate table 300 in order to track host requirements and network adapter requirements for virtual machines that execute stateful offload data transmissions. In one embodiment, a local distributed policy server may manage candidate table 300, which would include table entries at a local virtual network level. In another embodiment, a root distributed policy server may manage candidate table 300, which would include table entries at a global overlay network environment level (see FIG. 10 and corresponding text for further details).

Candidate table 300 includes a list of table entries, which include host names (column 310) and host properties (column 320). For example, a host system may provision a particular amount of processing power, memory, and bandwidth to a virtual machine. In one embodiment, column 320 may include minimum, nominal, and/or maximum host properties.

The table entries also include network adapter information for network adapters utilized by corresponding host systems. Column 330 includes network adapter identifiers and column 340 includes network adapter properties. The network adapter properties, in one embodiment, identify the network adapter's vendor ID and device ID. As such, the migration agent may discover an equivalent (matching) network adapter in order to migrate hardware state data in its native format to a different network adapter.

Figure 4:
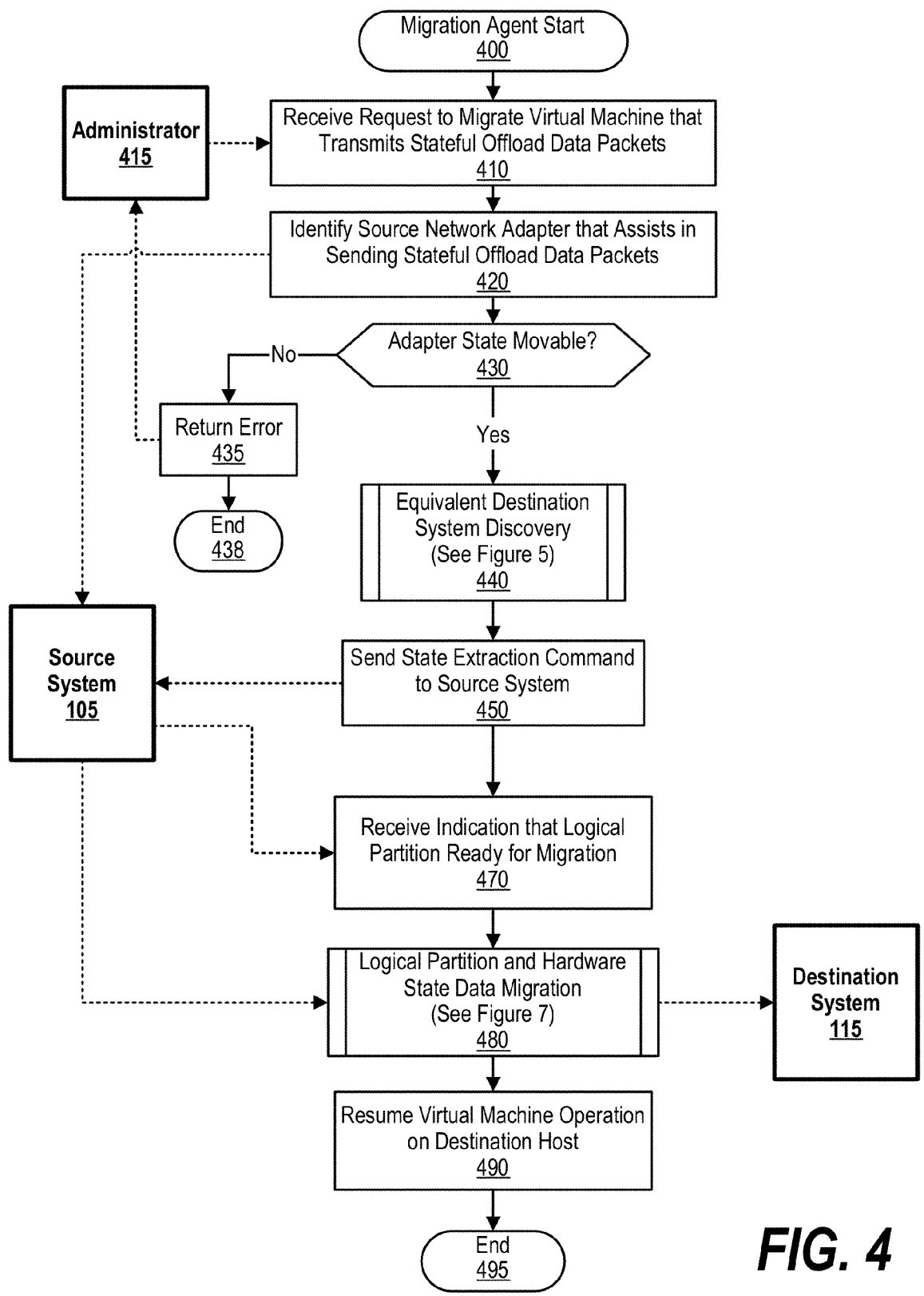
FIG. 4 is an exemplary flowchart showing steps taken in discovering a destination system and migrating a virtual machine to the destination system.

FIG. 4 is an exemplary flowchart showing steps taken in discovering a destination system and migrating a virtual machine from a source system to the destination system. Migration agent processing commences at 400, whereupon the migration agent receives a request from administrator 415 to migrate a virtual machine executing on a source system (step 410). The virtual machine transmits stateful offload data packets (e.g., RDMA) that traverse through a network adapter, which utilizes hardware state data to process the data packets.

At step 420, the migration agent identifies a source network adapter through which the virtual machine's data packets traverse (e.g., included in request or identified via a candidate table). A determination is made as to whether the network adapter's hardware state is movable (e.g., the adapter supports extraction, decision 430). If the network adapter's hardware state is not movable, decision 430 branches to the "No" branch, whereupon the migration agent returns an error to administrator 415 at step 435, and ends at step 438.

Figure 5:
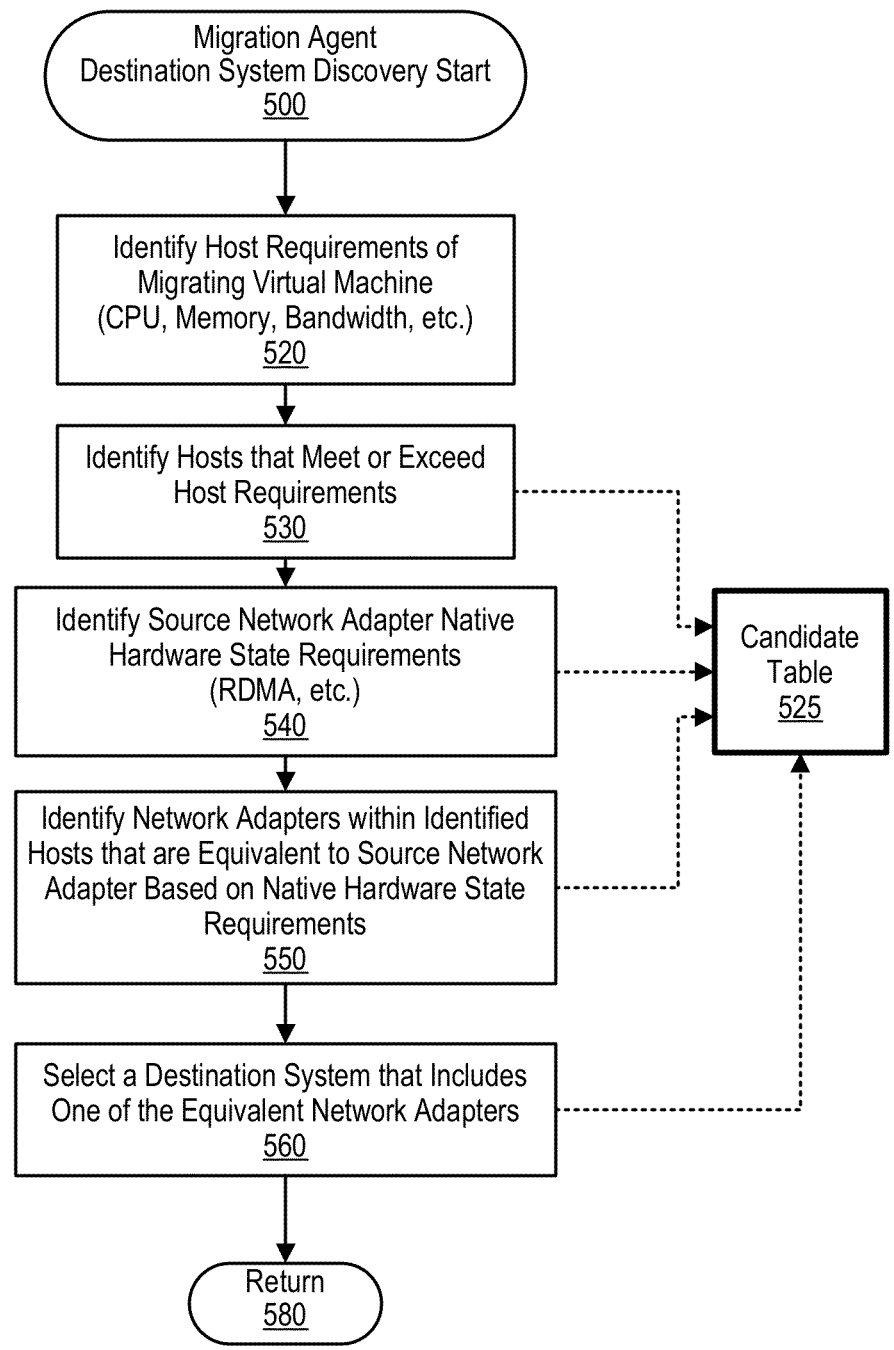
FIG. 5 is an exemplary flowchart showing steps taken in discovering a suitable destination system that includes a compatible host and an equivalent network adapter compared with a source system.

On the other hand, if the network adapter's hardware state is movable, decision 430 branches to the "Yes" branch, whereupon the migration agent proceeds through a series of steps to discover a suitable destination system whose network adapter supports the hardware state data utilized by the source network adapter (pre-defined process block 440, see FIG. 5 and corresponding text for further details).

Figure 6:
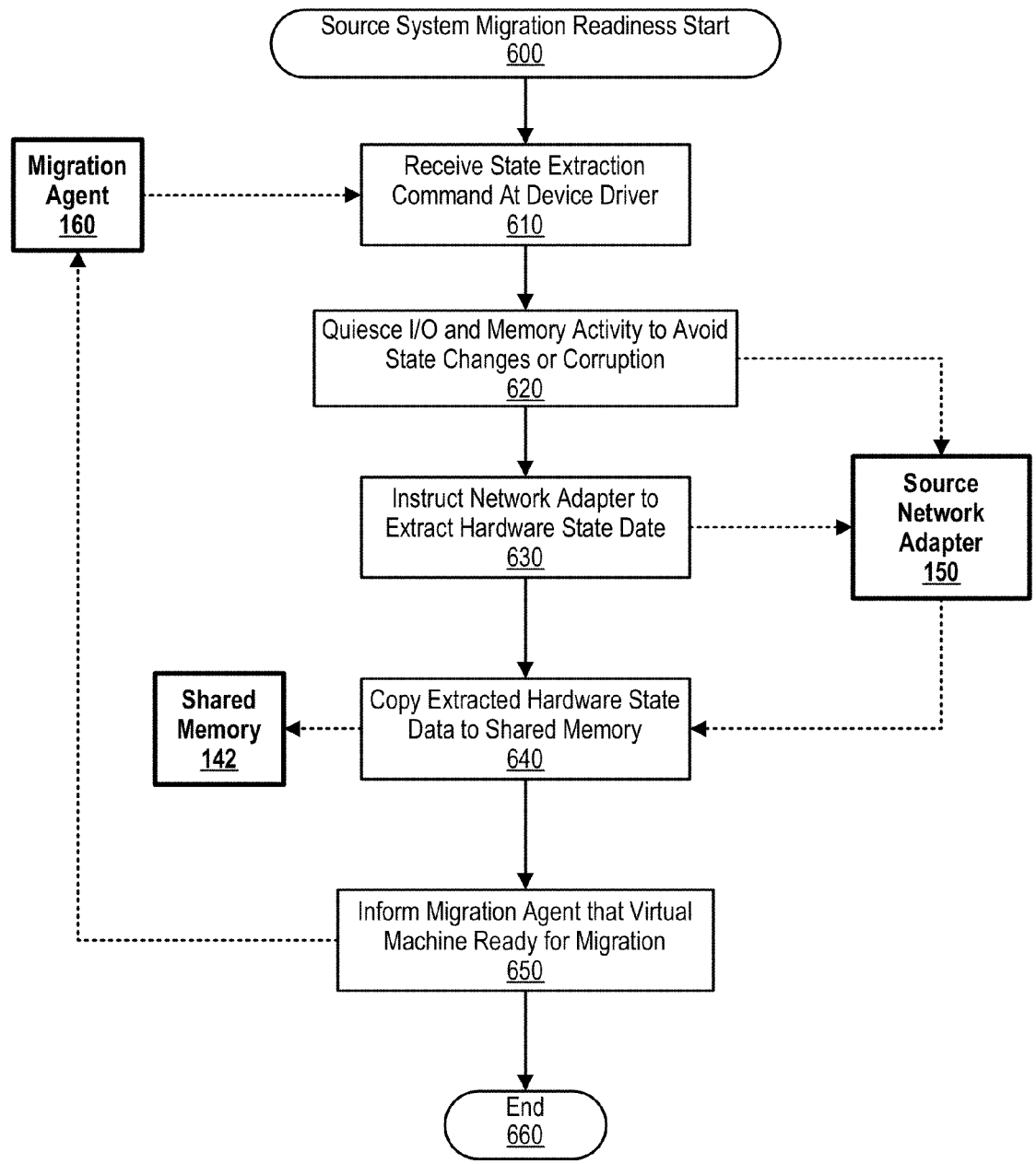
FIG. 6 is an exemplary flowchart showing steps taking in a host system preparing a virtual machine for migration.

At step 450, the migration agent issues an extraction command to the source network adapter (e.g., through its device driver or hypervisor) to quiesce I/O and memory activity, and copy the hardware state data to a shared memory location (see FIG. 6 and corresponding text for further details).

In turn, source system 105 sends an indication to the migration agent (received at step 570) that the hardware state data has been copied to shared memory. The migration agent sends a migration request to source system and destination system to establish a connection and migrate the virtual machine (includes the hardware state data) from source system 105 to destination system 115 (pre-defined process block 480, see FIG. 7 and corresponding text for further details). Once migrated, destination system 115's hypervisor configures its' destination network adapter according to the migrated hardware state data. The virtual machine resumes operation on destination system 115 at step 490, and migration agent processing ends at 495.

FIG. 5 is an exemplary flowchart showing steps taken in a migration agent discovering a suitable destination system that includes a compatible host and an equivalent network adapter. In one embodiment, an equivalent network adapter is an adapter that is able to utilize the source network adapter's hardware state data in its native hardware format (e.g., address translations are not required).

Destination discovery processing commences at 500, whereupon the migration agent (included in the distributed policy service) identifies system requirements corresponding to a migrating virtual machine at step 520. For example, the virtual machine system requirements may include processing speed, memory requirements, network bandwidth requirements, etc. At step 530, the migration agent accesses candidate table 525 and identifies compatible host systems that meet the host system requirements. In one embodiment, a host system is compatible when it is able to meet or exceed the virtual machine system requirements. For example, a virtual machine may require 4 GB of system memory and a host system may be able to provide 6 GB of system memory to the virtual machine.

At step 540, the migration agent identifies the source network adapter's native hardware properties included in candidate table 525. In one embodiment, the source network adapter's native hardware properties include the source network adapter's device id, firmware version, and other relevant adapter properties. Next, the migration agent identifies one or more network adapters utilized by the compatible host systems (from step 530) that are equivalent to the source network adapter's native hardware properties (step 550).

In turn, the migration agent selects one of the equivalent network adapters at step 560. In one embodiment, the migration agent sends a message to the network administrator and allows the network administrator to select one of the equivalent network adapters. Processing returns at 580.

FIG. 6 is an exemplary flowchart showing steps taking in a host system preparing a virtual machine for migration. Source system processing commences at 600, whereupon the source system receives a state extraction command from migration agent 160 to migrate a particular virtual machine executing on the source host system (step 610). At step 620, the source system (e.g., via a device driver or hypervisor) quiesces I/O and memory activity on source network adapter 150 in order to avoid state changes or corruption during the migration of the virtual machine.

At step 630, the source system instructs source network adapter 150 to extract hardware state data pertaining to the migrating virtual machine and, at step 640, the source system copies the hardware state data to shared memory 142, which is system memory and part of the virtual machine that migrates to the destination system. The source system informs migration agent 160 that the virtual machine is ready for migration at step 650, and source system processing ends at 660.

Figure 7:
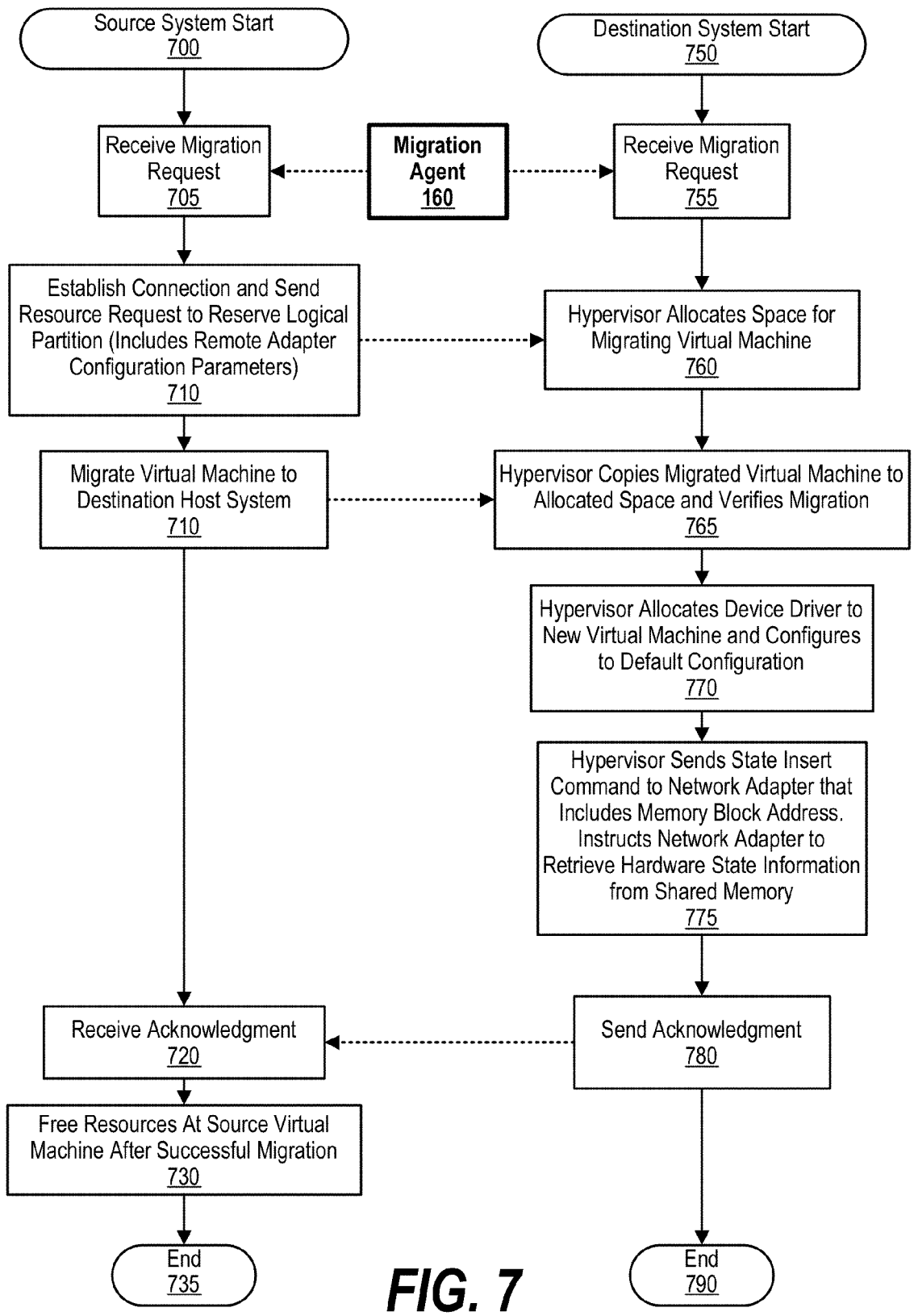
FIG. 7 is an exemplary flowchart showing steps taken in migrating a logical partition from a source system to a destination system.

FIG. 7 is an exemplary flowchart showing steps taken in migrating a virtual machine from a source system to a destination system. Source system processing commences at 700, whereupon the source system receives a request from migration agent 160 to migrate the source system to the destination system. Destination system processing commences, whereupon the destination system receives a corresponding request at 755.

At step 710, the source system's hypervisor establishes a connection with the destination system's hypervisor and requests the destination system to reserve resources for the migrating virtual machine. In one embodiment, the request includes remote adapter configuration parameters, which indicate a memory block starting address in the migrating virtual machine's shared memory where hardware state data is stored (step 710).

The destination system's hypervisor, at step 760, allocates space for the virtual machine. At steps 710 and 765, the hypervisors migrate the virtual machine from the source system to the destination system and, in one embodiment, the destination system verifies the migration, such as by a checksum computation. In turn, the destination system's hypervisor allocates a device driver to the migrated logical partition at step 770 in order for the virtual machine to communicate with the destination network adapter.

At step 775, the destination system's hypervisor sends a "State Insert" command to the destination network adapter, which instructs the destination network adapter to retrieve the hardware state data from shared memory at the memory block starting address and configure the destination network adapter accordingly. In one embodiment, the memory block starting addresses is included in the resource request sent by the source system's hypervisor (step 710 discussed above). In another embodiment, the source hypervisor sends a separate message to the destination hypervisor that includes the memory block starting address. Once configured, the destination hypervisor sends a migration acknowledgement to the source hypervisor at step 789, and destination hypervisor processing ends at 790.

The source hypervisor receives the successful migration acknowledgement at step 720, and frees the resources (virtual machine, device driver, shared memory, etc.) at the source system at step 730. Source hypervisor processing ends at 735.

Figure 8:
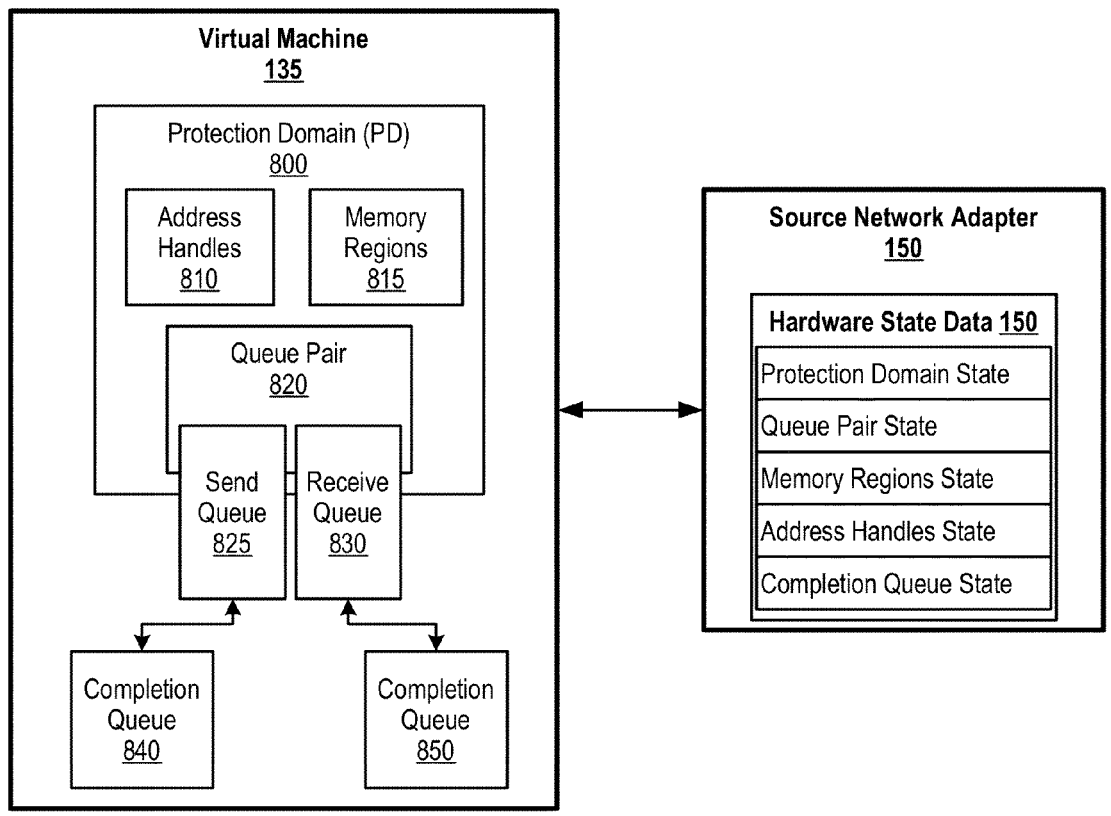
FIG. 8 is an exemplary diagram showing a network adapter tracking and storing hardware state data for modules executing on a virtual machine.

FIG. 8 is an exemplary diagram showing a network adapter tracking and storing hardware state data for modules executing on a virtual machine. Virtual machine 135 utilizes modules 800-850 to send/receive stateful offload data packets to/from other virtual machines through source network adapter 150. Each of modules 800-850 has a "state" on source network adapter 150, which are stored in hardware state data 152. In one embodiment, hardware state data 152 includes a grouping of state information that represents a connection/datagram state. For example, hardware state data 152 may include the following:

Protection Domain grouping of resources
Protection Domain device statistics
Queue Pair Send Queue Hardware producer index
Queue Pair Send Queue Software consumer index
Queue Pair Receive Queue Hardware producer index
Queue Pair Receive Queue Software consumer index
Associated Memory Regions
Associated Address Handles
Completion Queue Hardware producer index
Completion Queue Software consumer index
Completion Queue device statistics
Virtual to Logical/Bus address mappings When virtual machine 135 migrates to a destination system, hardware state data 152 is copied to a shared memory area and migrates with virtual machine 135 over to the destination system. In turn, the destination system configures its destination network adapter according to the migrated hardware state data 152. In one embodiment, source network adapter 150 may manage thousands of hardware state data 152's, each corresponding to a different virtual machine. In this embodiment, only hardware state data 152 corresponding to a migrating virtual machine is copied to the destination system.

Figure 9:
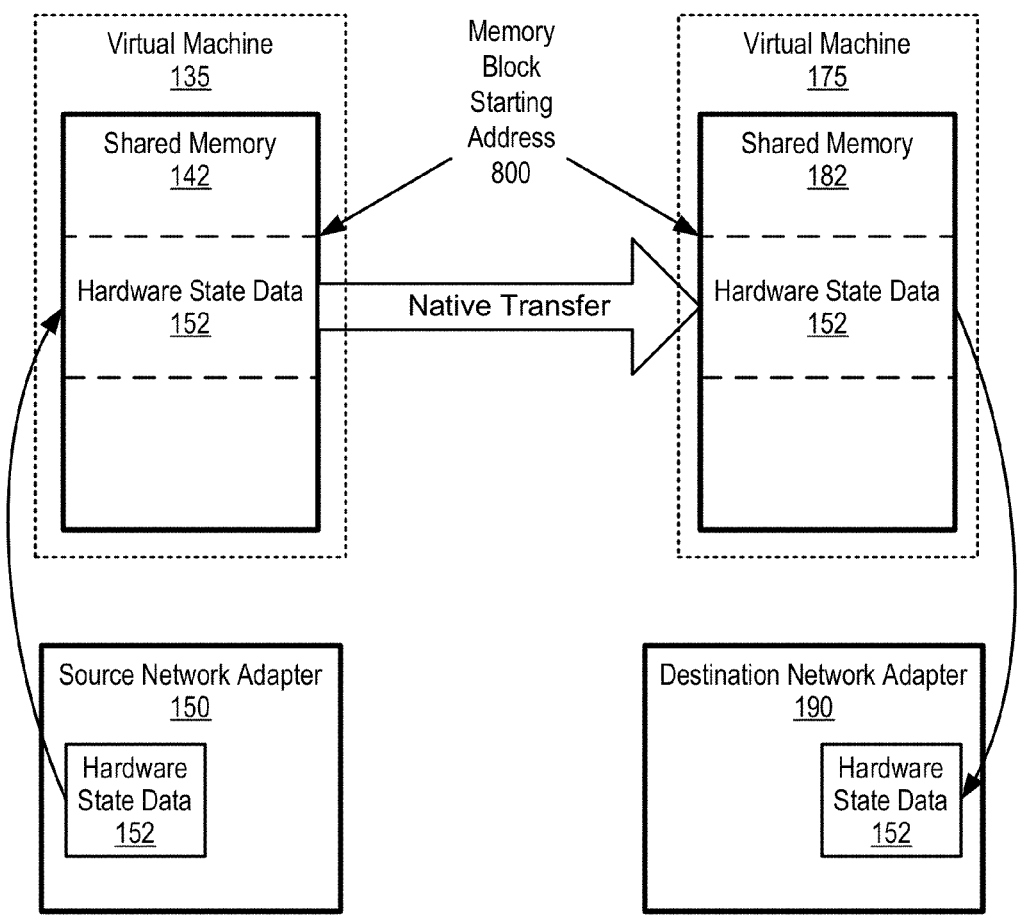
FIG. 9 is an exemplary diagram showing the migration of hardware state data from a source network adapter to a destination network adapter.

FIG. 9 is an exemplary diagram showing the migration of hardware state data from a source network adapter to a destination network adapter. Source network adapter 150 utilizes hardware state data 152 to send stateful offload data packets from a source virtual machine to a destination virtual machine. During migration to destination network adapter 190, hardware state data 152 is copied to shared memory 142 at memory block starting address 800. In turn, when virtual machine 135 is copied to a destination system as virtual machine 175, hardware state date 152 copies over in its native hardware format and is still stored at memory block starting address 800 on shared memory 182. In turn, hardware state data 152 is copied to destination network adapter 190 in its native hardware format due to the fact that destination network adapter 190 is equivalent to source network adapter 150.

Due to the fact that destination network adapter 190 is equivalent to source network adapter 150, destination network adapter 190 utilizes hardware state data in its native format, thus address translations are not required.

Figure 10:
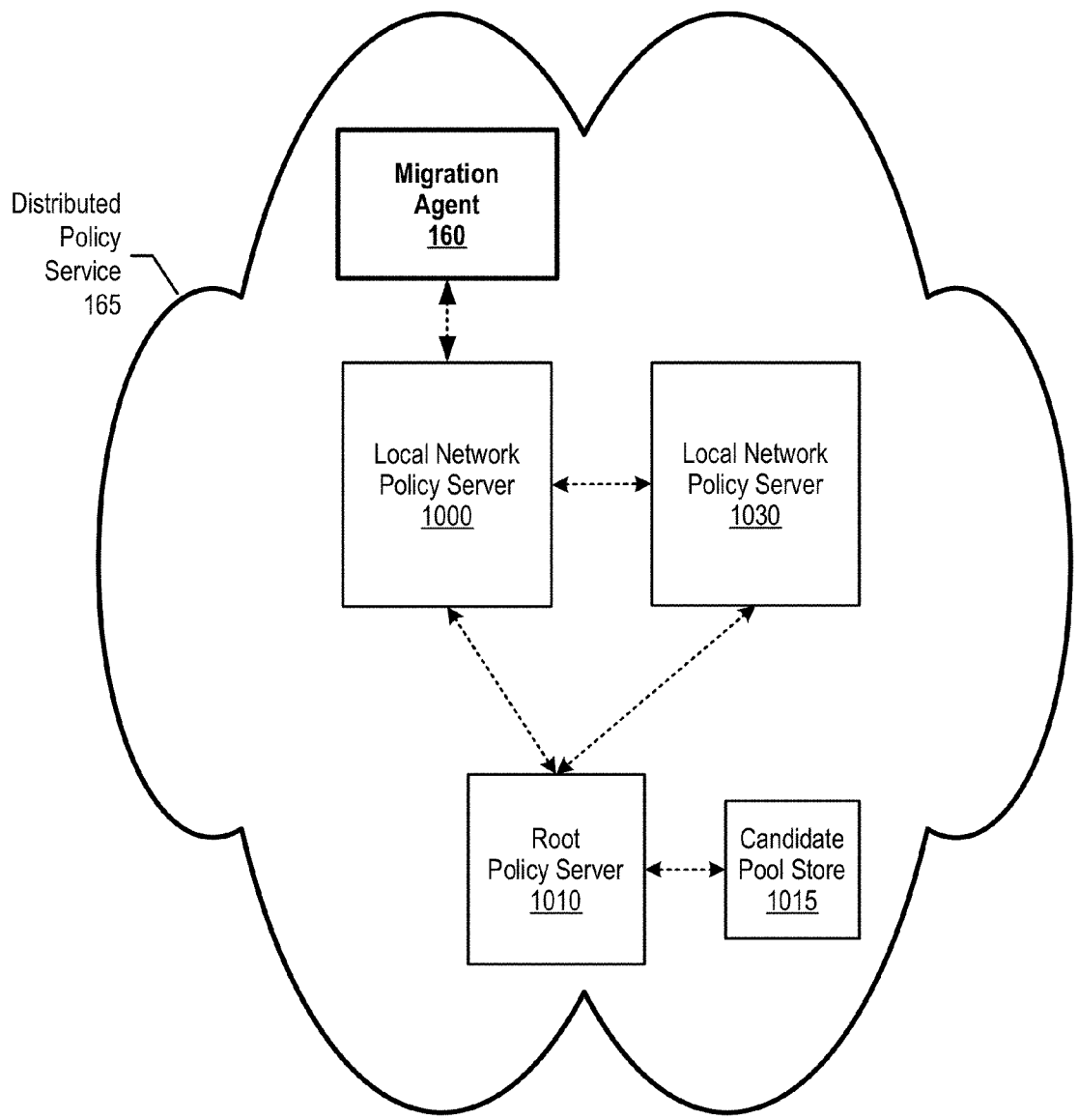
FIG. 10 is an exemplary diagram showing a distributed policy service accessing a candidate table storage area to identify a suitable destination system.

FIG. 10 is an exemplary diagram showing a distributed policy service accessing a candidate table storage area to identify a suitable destination system. Migration agent 160 interfaces with local network policy server to identify a suitable destination system. In one embodiment, local network policy server 1000 manages policies and physical path translations pertaining to the source system's overlay network (e.g., overlay network environment 100). In another embodiment, policy servers for different overlay networks are co-located and differentiate policy requests from different migration agents according to their corresponding overlay network identifier.

Distributed policy service 165 is structured hierarchally and, when local network policy server 1000 is not able to locate a suitable destination system, local network policy server 1000 queries root policy server 1010 to search for an suitable destination system. In turn, root policy server 1010 accesses candidate table store 1015 and send a suitable destination system identifier to local network policy server 1000, which sends it to migration agent 160. In one embodiment, root policy server 1010 may send local network policy server 1000 a message to query local network policy server 1030 for a suitable destination system, which manages other host systems than what local network policy server 1000 manages.

Figure 11:
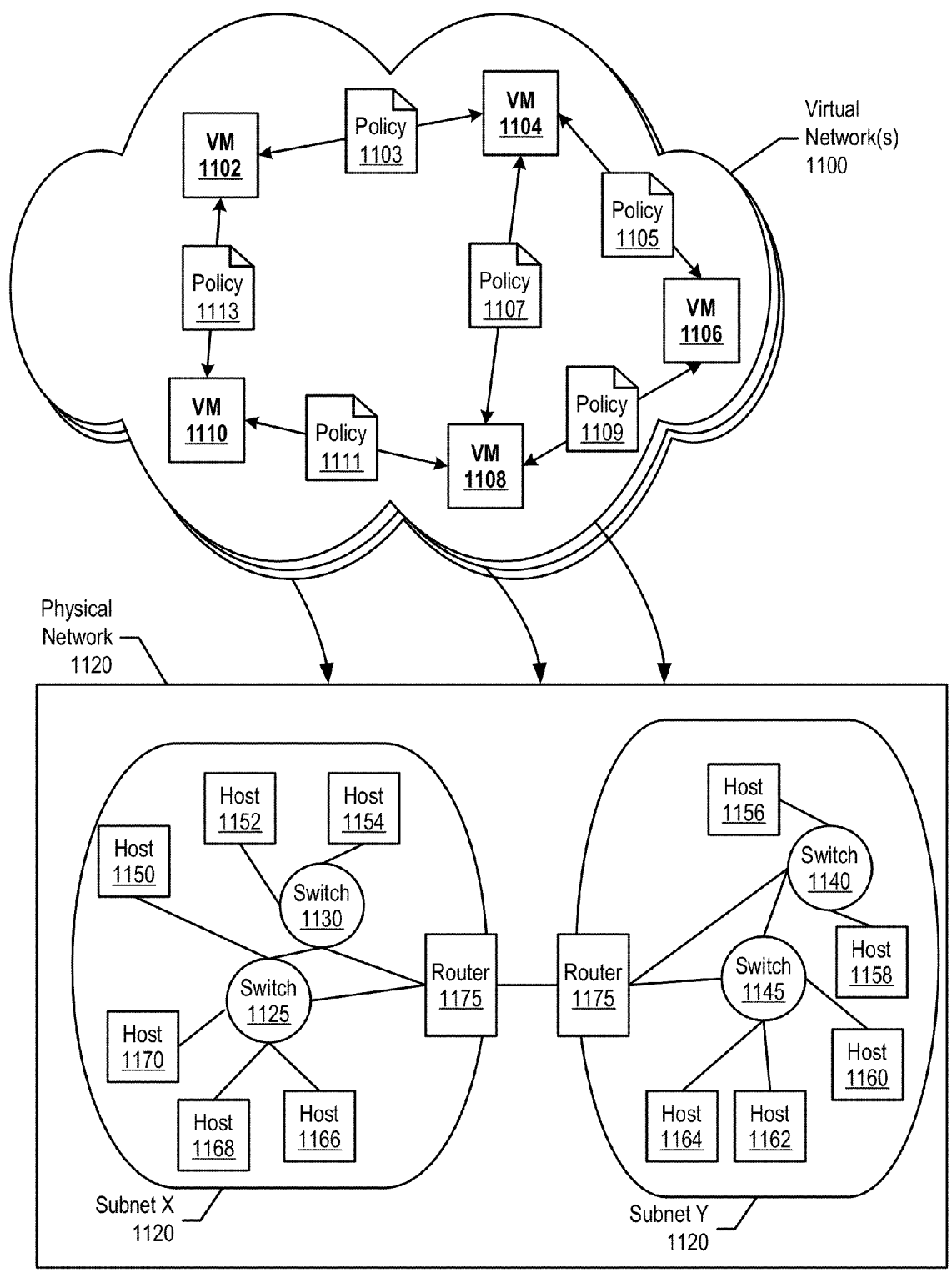
FIG. 11 is an exemplary diagram showing virtual network abstractions that are overlayed onto a physical network space.

FIG. 11 is an exemplary diagram showing virtual network abstractions that are overlayed onto a physical network space. Virtual networks 1100 are part of an overlay network environment and include policies (e.g., policies 1103-1113) that provide an end-to-end virtual connectivity between virtual machines (e.g., virtual machines 1102-1110). Each of virtual networks 110 corresponds to a unique virtual identifier, which allows concurrent operation of multiple virtual networks over physical space 1120. As those skilled in the art can appreciate, some of virtual networks 1100 may include a portion of virtual machines 1102-1110, while other virtual networks 1100 may include different virtual machines and different policies than what is shown in FIG. 11.

When a "source" virtual machine sends data to a "destination" virtual machine, a policy corresponding to the two virtual machines describes a logical path on which the data travels (e.g., through a firewall, through an accelerator, etc.). In other words, policies 1103-1113 define how different virtual machines communicate with each other (or with external networks). For example, a policy may define quality of service (QoS) requirements between a set of virtual machines; access controls associated with particular virtual machines; or a set of virtual or physical appliances (equipment) to traverse when sending or receiving data. In addition, some appliances may include accelerators such as compression, IP Security (IPSec), SSL, or security appliances such as a firewall or an intrusion detection system. In addition, a policy may be configured to disallow communication between the source virtual machine and the destination virtual machine.

Virtual networks 1100 are logically overlayed onto physical space 1120, which includes physical entities 1135 through 1188 (hosts, switches, and routers). While the way in which a policy is enforced in the system affects and depends on physical space 1120, virtual networks 1100 are more dependent upon logical descriptions in the policies. As such, multiple virtual networks 1100 may be overlayed onto physical space 1120. As can be seen, physical space 1120 is divided into subnet X 1125 and subnet Y 1130. The subnets are joined via routers 1135 and 1140. Virtual networks 1100 are independent of physical constraints of physical space 1120 (e.g., L2 layer constraints within a subnet). Therefore, a virtual network may include physical entities included in both subnet X 1125 and subnet Y 1130.

In one embodiment, the virtual network abstractions support address independence between different virtual networks 1100. For example, two different virtual machines operating in two different virtual networks may have the same IP address. As another example, the virtual network abstractions support deploying virtual machines, which belong to the same virtual networks, onto different hosts that are located in different physical subnets (includes switches and/or routers between the physical entities). In another embodiment, virtual machines belonging to different virtual networks may be hosted on the same physical host. In yet another embodiment, the virtual network abstractions support virtual machine migration anywhere in a data center without changing the virtual machine's network address and losing its network connection.

For further details regarding this architecture, see "Virtual Switch Data Control in a Distributed Overlay Network," Ser. No. 13/204,211, filed Aug. 5, 2011, which is incorporated herein by reference.

Figure 12:
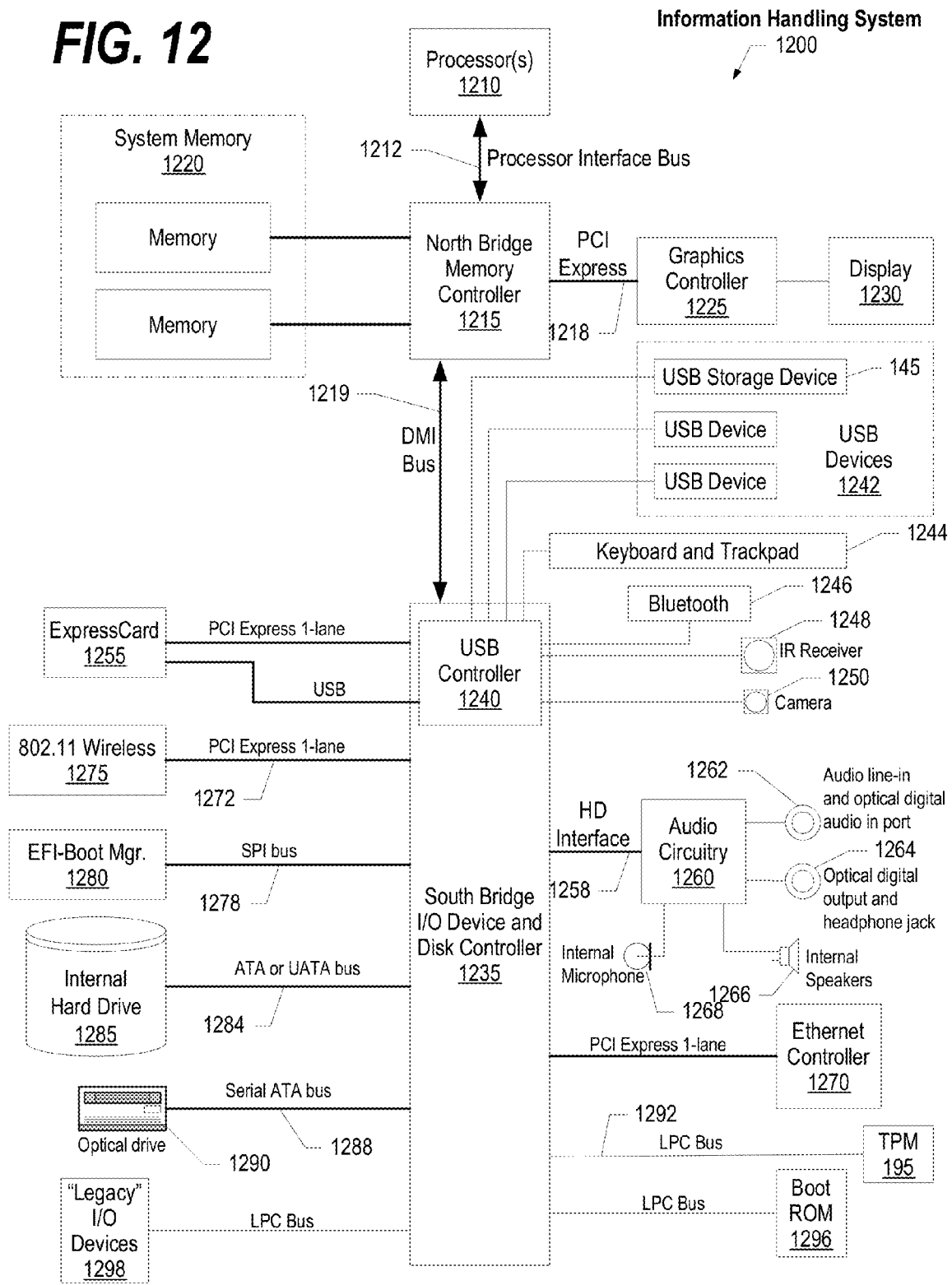
FIG. 12 is an exemplary block diagram of a data processing system in which the methods described herein can be implemented.

FIG. 12 illustrates information handling system 1200, which is a simplified example of a computer system capable of performing the computing operations described herein. Information handling system 1200 includes one or more processors 1210 coupled to processor interface bus 1212. Processor interface bus 1212 connects processors 1210 to Northbridge 1215, which is also known as the Memory Controller Hub (MCH). Northbridge 1215 connects to system memory 1220 and provides a means for processor(s) 1210 to access the system memory. Graphics controller 1225 also connects to Northbridge 1215. In one embodiment, PCI Express bus 1218 connects Northbridge 1215 to graphics controller 1225. Graphics controller 1225 connects to display device 1230, such as a computer monitor.

Northbridge 1215 and Southbridge 1235 connect to each other using bus 1219. In one embodiment, the bus is a Direct Media Interface (DMI) bus that transfers data at high speeds in each direction between Northbridge 1215 and Southbridge 1235. In another embodiment, a Peripheral Component Interconnect (PCI) bus connects the Northbridge and the Southbridge. Southbridge 1235, also known as the I/O Controller Hub (ICH) is a chip that generally implements capabilities that operate at slower speeds than the capabilities provided by the Northbridge. Southbridge 1235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 1296 and "legacy" I/O devices (using a "super I/O" chip). The "legacy" I/O devices (1298) can include, for example, serial and parallel ports, keyboard, mouse, and/or a floppy disk controller. The LPC bus also connects Southbridge 1235 to Trusted Platform Module (TPM) 1295. Other components often included in Southbridge 1235 include a Direct Memory Access (DMA) controller, a Programmable Interrupt Controller (PIC), and a storage device controller, which connects Southbridge 1235 to nonvolatile storage device 1285, such as a hard disk drive, using bus 1284.

ExpressCard 1255 is a slot that connects hot-pluggable devices to the information handling system. ExpressCard 1255 supports both PCI Express and USB connectivity as it connects to Southbridge 1235 using both the Universal Serial Bus (USB) the PCI Express bus. Southbridge 1235 includes USB Controller 1240 that provides USB connectivity to devices that connect to the USB. These devices include webcam (camera) 1250, infrared (IR) receiver 1248, keyboard and trackpad 1244, and Bluetooth device 1246, which provides for wireless personal area networks (PANs). USB Controller 1240 also provides USB connectivity to other miscellaneous USB connected devices 1242, such as a mouse, removable nonvolatile storage device 1245, modems, network cards, ISDN connectors, fax, printers, USB hubs, and many other types of USB connected devices. While removable nonvolatile storage device 1245 is shown as a USB-connected device, removable nonvolatile storage device 1245 could be connected using a different interface, such as a Firewire interface, etcetera.

Wireless Local Area Network (LAN) device 1275 connects to Southbridge 1235 via the PCI or PCI Express bus 1272. LAN device 1275 typically implements one of the IEEE 802.11 standards of over-the-air modulation techniques that all use the same protocol to wirelessly communicate between information handling system 1200 and another computer system or device. Optical storage device 1290 connects to Southbridge 1235 using Serial ATA (SATA) bus 1288. Serial ATA adapters and devices communicate over a high-speed serial link. The Serial ATA bus also connects Southbridge 1235 to other forms of storage devices, such as hard disk drives. Audio circuitry 1260, such as a sound card, connects to Southbridge 1235 via bus 1258. Audio circuitry 1260 also provides functionality such as audio line-in and optical digital audio in port 1262, optical digital output and headphone jack 1264, internal speakers 1266, and internal microphone 1268. Ethernet controller 1270 connects to Southbridge 1235 using a bus, such as the PCI or PCI Express bus. Ethernet controller 1270 connects information handling system 1200 to a computer network, such as a Local Area Network (LAN), the Internet, and other public and private computer networks.

While FIG. 12 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 1295) shown in FIG. 12 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 13.

Figure 13:
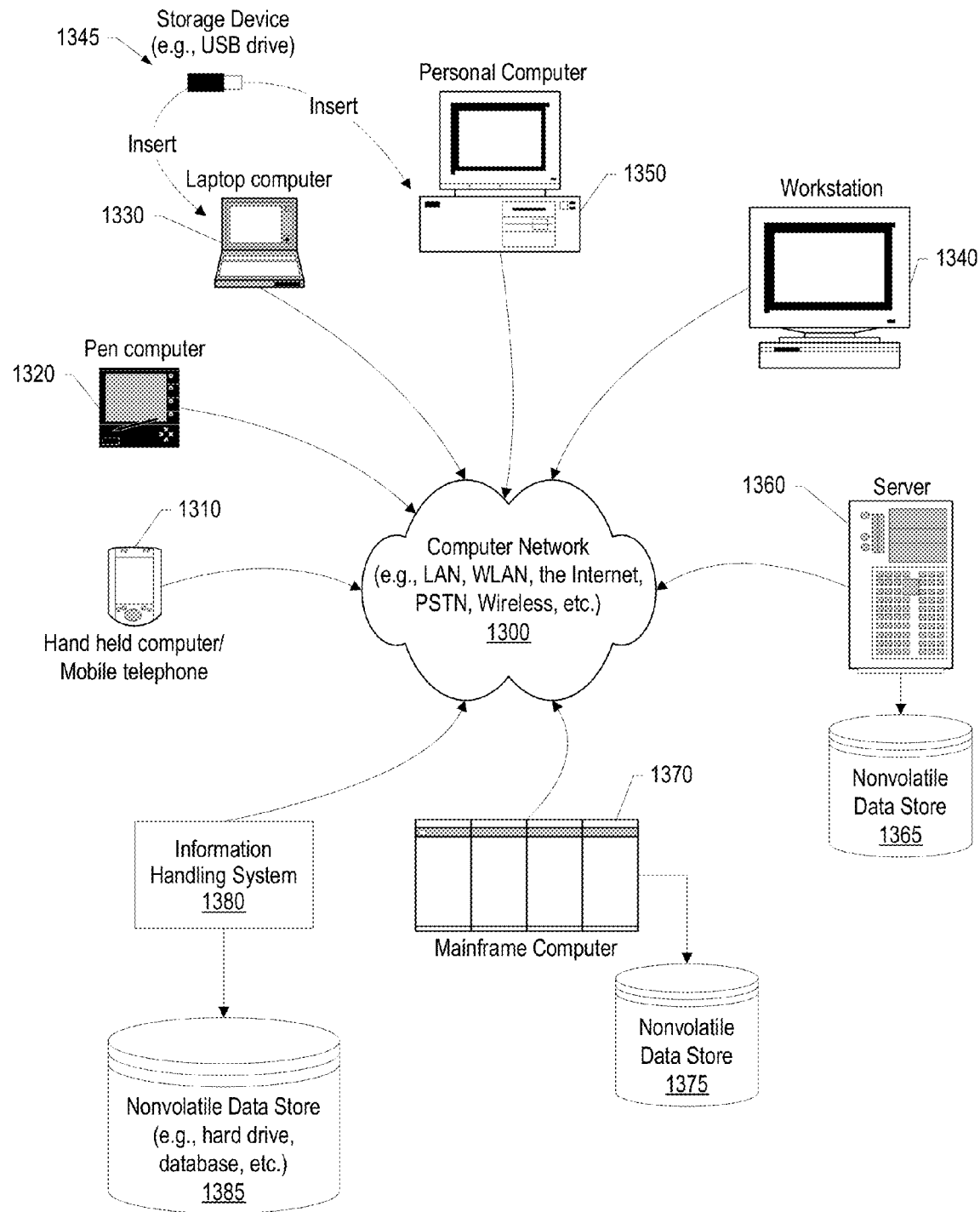
FIG. 13 provides an extension of the information handling system environment shown in FIG. 12 to illustrate that the methods described herein can be performed on a wide variety of information handling systems which operate in a networked environment.

FIG. 13 provides an extension of the information handling system environment shown in FIG. 12 to illustrate that the methods described herein can be performed on a wide variety of information handling systems that operate in a networked environment. Types of information handling systems range from small handheld devices, such as handheld computer/mobile telephone 1310 to large mainframe systems, such as mainframe computer 1370. Examples of handheld computer 1310 include personal digital assistants (PDAs), personal entertainment devices, such as MP3 players, portable televisions, and compact disc players. Other examples of information handling systems include pen, or tablet, computer 1320, laptop, or notebook, computer 1330, workstation 1340, personal computer system 1350, and server 1360. Other types of information handling systems that are not individually shown in FIG. 13 are represented by information handling system 1380. As shown, the various information handling systems can be networked together using computer network 1300. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 13 depicts separate nonvolatile data stores (server 1360 utilizes nonvolatile data store 1365, mainframe computer 1370 utilizes nonvolatile data store 1375, and information handling system 1380 utilizes nonvolatile data store 1385). The nonvolatile data store can be a component that is external to the various information handling systems or can be internal to one of the information handling systems. In addition, removable nonvolatile storage device 1245 can be shared among two or more information handling systems using various techniques, such as connecting the removable nonvolatile storage device 1245 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
 receiving a migration request to move a virtual machine executing on a first system;
 identifying a first network adapter that corresponds to the first system, wherein the first network adapter includes hardware state data based upon a stateful offload format and used by the first network adapter to process data packets generated by the virtual machine, the hardware state data stored in a native format in a memory area located on the first network adapter;
 identifying a second network adapter that is compatible with the native format based upon one or more first network adapter properties of the first network adapter being equivalent to one or more second network adapter properties of the second network adapter, wherein the second network adapter is included in a second system; and
 migrating the virtual machine to the second system.

2. The method of claim 1 wherein each of the one or more first network adapter properties matches one of the one or more second network adapter properties.

3. The method of claim 1 wherein the first system includes a first host and the second system includes a second host, the method further comprising:
 identifying one or more first host requirements that correspond to the virtual machine, wherein at least one of the first host requirements is selected from the group consisting of a processing requirement, a memory requirement, and a bandwidth requirement; and
 determining that the second host supports each of the one or more first host requirements.

4. The method of claim 1 wherein the stateful offload format is selected from the group consisting of a Remote Direct Memory Access (RDMA) format, an Internet Wide RDMA Protocol (iWARP) format, an Infiniband (IB) format, and a TCP Offload Engine (TOE) format.

5. The method of claim 4 wherein the data packets are sent by the first network adapter through an overlay network environment to a destination virtual machine, the overlay network environment including one or more virtual networks that are independent of physical topology constraints of a physical network.

6. The method of claim 5 wherein the overlay network environment includes a distributed policy service that determines that the second network adapter is equivalent to the first network adapter.

7. The method of claim 1 further comprising:
 resuming the virtual machine execution on the second system according to the hardware state data; and
 freeing one or more resources on the first system in response to resuming the virtual machine execution on the second system.

8. A method comprising:
 receiving a migration request to move a virtual machine executing on a first system, wherein the first system includes a first network adapter;
 identifying one or more host requirements that correspond to the virtual machine;
 identifying a plurality of compatible hosts that each support the one or more host requirements;
 identifying one or more first network adapter properties corresponding to the first network adapter, wherein the first network adapter includes hardware state data stored in a native format and utilized by the first network adapter to process data packets according to a stateful offload format;
 selecting a second network adapter corresponding to one of the plurality of compatible hosts that is compatible with the native formation and equivalent to each of the one or more first network adapter properties; and
 migrating the virtual machine to a second system that includes the selected second network adapter.

9. An information handling system comprising:
 one or more processors;
 a memory coupled to at least one of the processors;
 a set of computer program instructions stored in the memory and executed by at least one of the processors in order to perform actions of:
  receiving a migration request to move a virtual machine executing on a first system;
  identifying a first network adapter that corresponds to the first system, wherein the first network adapter includes hardware state data based upon a stateful offload format and used by the first network adapter to process data packets generated by the virtual machine, the hardware state data stored in a native format in a memory area located on the first network adapter;

identifying a second network adapter that is compatible with the native format based upon one or more first network adapter properties of the first network adapter being equivalent to one or more second network adapter properties of the second network adapter, wherein the second network adapter is included in a second system; and migrating the virtual machine to the second system.

10. The information handling system of claim 9 wherein each of the one or more first network adapter properties matches one of the one or more second network adapter properties.

11. The information handling system of claim 9 wherein the first system includes a first host and the second system includes a second host, and wherein the processors perform additional actions comprising:

identifying one or more first host requirements that correspond to the virtual machine, wherein at least one of the first host requirements is selected from the group consisting of a processing requirement, a memory requirement, and a bandwidth requirement; and determining that the second host supports each of the one or more first host requirements.

12. The information handling system of claim 9 wherein the stateful offload format is selected from the group consisting of a Remote Direct Memory Access (RDMA) format, an Internet Wide RDMA Protocol (iWARP) format, an Infiniband (IB) format, and a TCP Offload Engine (TOE) format.

13. The information handling system of claim 12 wherein the data packets are sent by the first network adapter through an overlay network environment to a destination virtual machine, the overlay network environment including one or more virtual networks that are independent of physical topology constraints of a physical network.

14. The information handling system of claim 13 wherein the information handling system is a distributed policy service included in the overlay network environment.

15. The information handling system of claim 9 wherein the processors perform additional actions comprising:

resuming the virtual machine execution on the second system according to the hardware state data; and freeing one or more resources on the first system in response to resuming the virtual machine execution on the second system.

16. A computer program product stored in a computer readable memory device, comprising computer program code that, when executed by an information handling system, causes the information handling system to perform actions comprising:

receiving a migration request to move a virtual machine executing on a first system;

identifying a first network adapter that corresponds to the first system, wherein the first network adapter includes hardware state data based upon a stateful offload format and used by the first network adapter to process data packets generated by the virtual machine, the hardware state data stored in a native format in a memory area located on the first network adapter;

identifying a second network adapter that is compatible with the native format based upon one or more first network adapter properties of the first network adapter being equivalent to one or more second network adapter properties of the second network adapter, wherein the second network adapter is included in a second system; and migrating the virtual machine to the second system.

17. The computer program product of claim 16 wherein each of the one or more first network adapter properties matches one of the one or more second network adapter properties.

18. The computer program product of claim 16 wherein the first system includes a first host and the second system includes a second host, and wherein the information handling system performs additional actions comprising:

identifying one or more first host requirements that correspond to the virtual machine, wherein at least one of the first host requirements is selected from the group consisting of a processing requirement, a memory requirement, and a bandwidth requirement; and determining that the second host supports each of the one or more first host requirements.

19. The computer program product of claim 16 wherein the stateful offload format is selected from the group consisting of a Remote Direct Memory Access (RDMA) format, an Internet Wide RDMA Protocol (iWARP) format, an Infiniband (IB) format, and a TCP Offload Engine (TOE) format.

20. The computer program product of claim 19 wherein the data packets are sent by the first network adapter through an overlay network environment to a destination virtual machine, the overlay network environment including one or more virtual networks that are independent of physical topology constraints of a physical network.

21. The computer program product of claim 20 wherein the overlay network environment includes a distributed policy service that determines that the second network adapter is equivalent to the first network adapter.

22. The computer program product of claim 16 wherein the information handling system performs perform additional actions comprising:

resuming the virtual machine execution on the second system according to the hardware state data; and freeing one or more resources on the first system in response to resuming the virtual machine execution on the second system.

* * * * *